United States Patent [19]

Jeong

[11] Patent Number: 5,779,485

[45] Date of Patent: Jul. 14, 1998

[54] METHODS FOR CONTROLLING RECITING TIME OF LANGUAGE LEARNING DEVICE

[75] Inventor: Byung Mann Jeong, Suwon, Rep. of Korea

[73] Assignee: Samsung Electronics Co., Ltd., Kyungki-do, Rep. of Korea

[21] Appl. No.: 633,442

[22] Filed: Apr. 17, 1996

[30] Foreign Application Priority Data

Apr. 28, 1995 [KR] Rep. of Korea ............... 1995 10331

[51] Int. Cl.$^6$ ............................................. G09B 7/06
[52] U.S. Cl. .................... 434/321; 434/156; 434/335; 434/118; 704/275
[58] Field of Search ........................... 434/156, 157, 434/169, 185, 308, 319–322, 365, 335, 118; 395/135; 704/275; 455/165.1, 183.1, 183.2, 186.1, 212; 345/135

[56] References Cited

U.S. PATENT DOCUMENTS

| | | | |
|---|---|---|---|
| 3,699,670 | 10/1972 | Takeda | 434/319 |
| 3,705,271 | 12/1972 | De Bell et al. | 434/320 X |
| 3,765,106 | 10/1973 | Cornell, III | 434/320 |
| 4,380,438 | 4/1983 | Okamoto | 434/320 X |
| 4,630,301 | 12/1986 | Hohl et al. | 704/275 |
| 4,643,682 | 2/1987 | Migler | 434/321 |
| 5,191,488 | 3/1993 | Hashimoto | |
| 5,230,023 | 7/1993 | Nakano | 704/275 |
| 5,357,596 | 10/1994 | Takebayashi et al. | 704/275 |
| 5,375,063 | 12/1994 | Peck et al. | 704/275 X |

*Primary Examiner*—Joe Cheng
*Attorney, Agent, or Firm*—Sughrue, Mion, Zinn, Macpeak & Seas, PLLC

[57] ABSTRACT

A method for controlling the reciting time of a language learning device. The language learning device has a recording medium for recording a voice signal thereon, a timer for outputting time information, a motor for transporting the recording medium in the desired direction, and a microcomputer for controlling the entire operation of the language learning device. The microcomputer stops the motor to suspend a reproduction operation until the input of a voice signal recited by the user is completed. If the input of the recited voice signal is completed, the microcomputer drives the motor to resume the reproduction operation. According to the present invention, after a reproduced voice signal from the recording medium is outputted, the reproduction operation is suspended regardless of the length of the reproduced voice signal for a time period during which the user gives a language recitation. Therefore, the user has a sufficient reciting time, resulting in an increase in language learning efficiency.

3 Claims, 2 Drawing Sheets

METHODS FOR CONTROLLING RECITING TIME OF LANGUAGE LEARNING DEVICE

BACKGROUND OF THE INVENTION

1. Field of the Invention

The present invention relates in general to controlling the reciting time of a language learning device, and more particularly to a method for controlling the reciting time of a language learning device in which a motor is controlled to transport a recording medium according to the input of a voice signal recited by the user, regardless of the length of a voice signal reproduced from the recording medium, so that the user has sufficient time for reciting a passage.

2. Description of the Prior Art

Generally, language learning devices have been used to enhance language learning efficiency. Such a conventional language learning device allows a user to practice speaking by performing a reproduction operation at an interval of a sentence or a desired time. The conventional language learning device has a motor for transporting a recording medium at a desired speed and a storage medium for storing a voice signal reproduced from the recording medium. The voice signal is reproduced from the recording medium for a predetermined time period and then stored into the storage medium. The reproduced voice signal stored in the storage medium is repeatedly outputted according to a user's selection. The motor is temporarily stopped for the predetermined time period to allow the user to recite the reproduced voice signal.

Namely, in the above-mentioned conventional language learning device, the reproduced voice signal is outputted for the predetermined time period that the motor is temporarily stopped. For this reason, in the case where the user is poor in speaking, he may not fully recite the reproduced voice signal within the predetermined time period that the reproduced voice signal is outputted. In other words, because the conventional language learning device outputs the subsequent reproduced voice signal regardless of whether the recitation has been completed, the user cannot accurately learn the corresponding reproduced contents. As a result, the above-mentioned conventional language learning device has a disadvantage in that it does not provide a completely adequate learning experience for the user.

SUMMARY OF THE INVENTION

Therefore, the present invention has been made in view of the above problem, and it is an object of the present invention to provide a method for controlling the reciting time of a language learning device, in which the input of a voice signal recited by the user is checked and a reproduction operation is suspended regardless of a reproduction time when the recited voice signal is inputted, so that the user has sufficient reciting time, resulting in an enhanced learning experience.

In accordance with the present invention, the above and other objects are accomplished by providing a method for controlling the reciting time of a language learning device, where the language learning device has a recording medium for recording a voice signal thereon, a timer for outputting time information, a motor for transporting the recording medium in the desired direction, and a microcomputer for controlling the entire operation of the language learning device, the method comprising the first step of reproducing the voice signal recorded on the recording medium at an interval of a desired unit; and the second step of stopping the motor to suspend the reproduction operation until the input of a voice signal recited by the user is completed and driving the motor if the input of the recited voice signal is completed, to resume the reproduction operation.

The second step includes: a third step of stopping the motor if no reproduced voice signal is inputted for a predetermined time period, to suspend the reproduction operation; a fourth step of checking whether the recited voice signal has been inputted and maintaining the motor at its stopped state if it is checked that the recited voice signal has been inputted; and a fifth step of driving the motor if it is determined at the fourth step that no recited voice signal has been inputted, to resume the reproduction operation.

The fifth step includes: a sixth step of setting a reference time; a seventh step of starting a counting operation from the moment that the input of the voice signal recited by the user is discontinued; an eighth step of checking whether the counted time is greater than the reference time; a ninth step of driving the motor if it is determined at the eighth step that the counted time is greater than the reference time, to resume the reproduction operation; a tenth step of checking whether the recited voice signal has been inputted, if it is checked at the eighth step that the counted time is not greater than the reference time; and an eleventh step of returning to the fourth step if it is determined at the tenth step that the recited voice signal has been inputted.

Preferably, the reference time is flexibly set according to the user's language learning ability.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
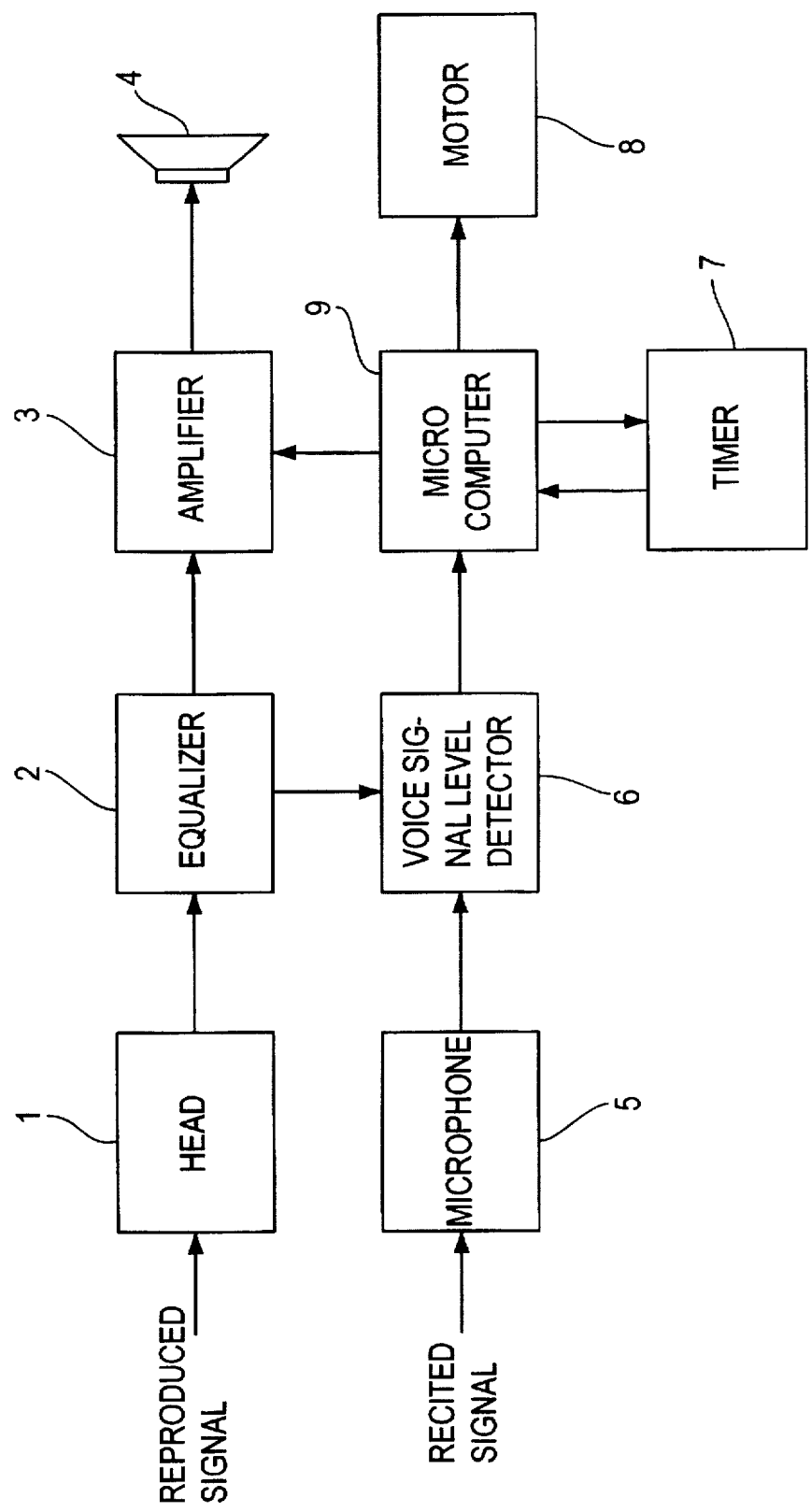
FIG. 1 is a schematic block diagram of a language learning device to which the present invention is applied.

Referring to FIG. 1, there is shown a schematic block diagram of a language learning device which is applied to the present invention. As shown in this drawing, the language learning device comprises a head 1 for detecting a voice signal recorded on a recording medium (not shown) to reproduce the recorded voice signal, an equalizer 2 for equalizing an output signal from the head 1, an amplifier 3 for amplifying an output signal from the equalizer 2 by a predetermined level, a speaker 4 for transferring an output signal from the amplifier 3 to the user, a microphone 5 for detecting a voice signal recited by the user, a voice signal level detector 6 for detecting the level of an output signal from the microphone 5, a timer 7 for outputting time information, a motor 8 for transporting the recording medium in the desired direction, and a microcomputer 9 for controlling the entire operation of the language learning device.

The operation of the language learning device with the above-mentioned construction will hereinafter be described in detail with reference to FIG. 2.

Figure 2:
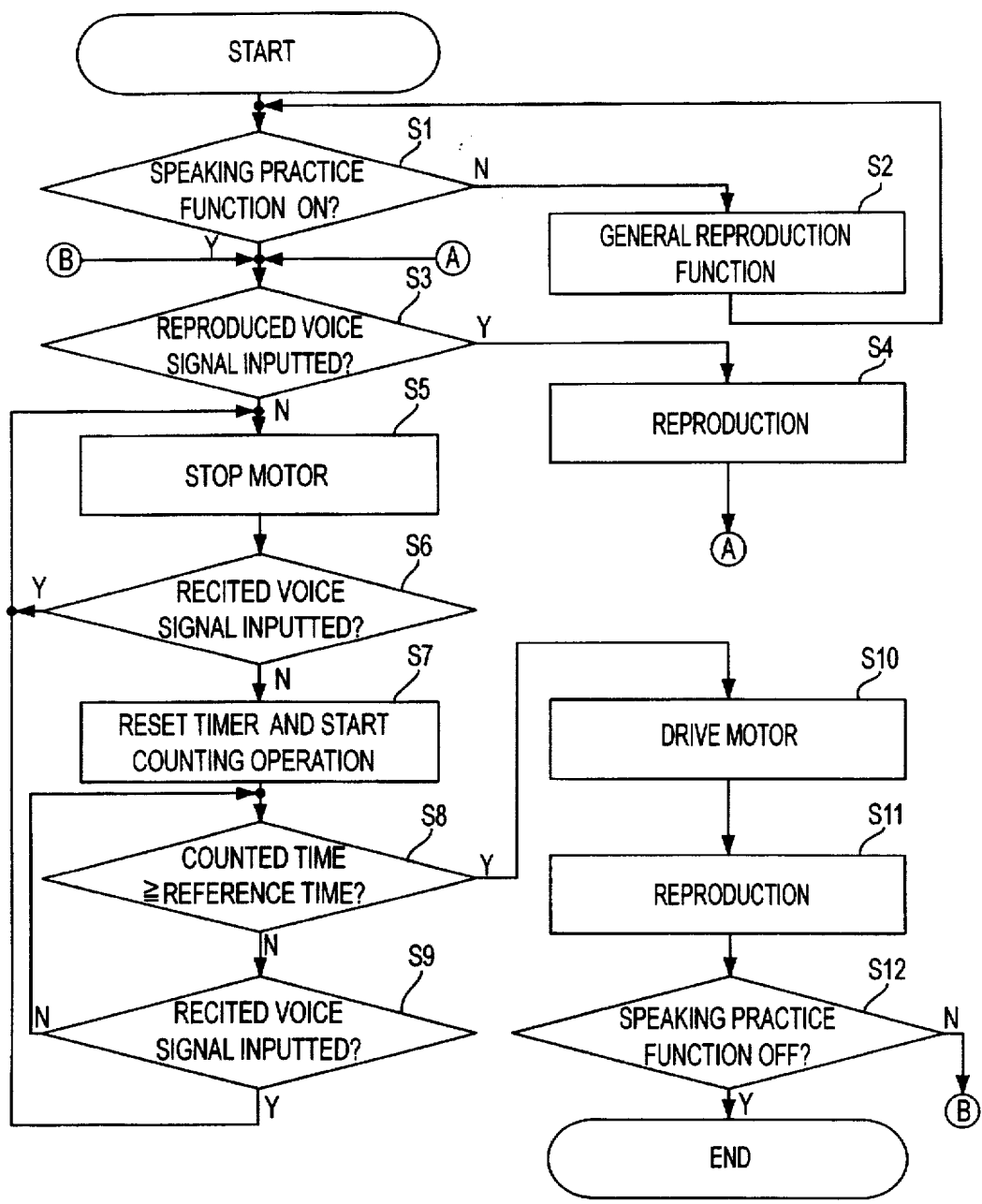
FIG. 2 is a flowchart illustrating the operation of a microcomputer in FIG. 1 which performs a method for controlling the reciting time of a language learning device in accordance with the present invention.

FIG. 2 is a flowchart illustrating the operation of the microcomputer 9 in FIG. 1 which performs a method for controlling the reciting time of a language learning device in accordance with the present invention.

First, the microcomputer 9 checks at step S1 whether a speaking practice function has been selected by the user. If it is checked at step S1 that the speaking practice function has not been selected by the user, the microcomputer 9 performs a general reproduction function at step S2. In the case where the general reproduction function is selected by the microcomputer 9, a voice signal recorded on the recording medium (not shown) is detected by the head 1 and then applied to the equalizer 2. The equalizer 2 compensates for a frequency level of the voice signal detected by the head 1. The amplifier 3 amplifies an output voice signal from the equalizer 2 by the predetermined level and outputs the resultant voice signal externally through the speaker 4. As a result, the user can listen to the reproduced voice signal from the recording medium.

In the case where it is checked at step S1 that the speaking practice function has been selected by the user, the microcomputer 9 checks at step S3 whether a reproduced voice signal from the recording medium has been inputted. Namely, the voice signal detected by the head 1 is compensated for its frequency by the equalizer 2 and then applied to the voice signal level detector 6. The voice signal level detector 6 detects the level of an output signal from the equalizer 2 and supplies the detected level to the microcomputer 9. The microcomputer 9 compares the detected level from the voice signal level detector 6 with a predetermined reference level. If the detected level from the voice signal level detector 6 is higher than the predetermined reference level, the microcomputer 9 determines that a reproduced voice signal from the recording medium has been inputted. On the contrary, if the detected level from the voice signal level detector 6 is lower than the predetermined reference level, the microcomputer 9 determines that no reproduced voice signal from the recording medium has been inputted or that a noise signal has been inputted.

If it is checked at step S3 that the reproduced voice signal from the recording medium has been inputted, the microcomputer 9 performs a reproduction operation at step S4 and then returns to step S3 to check whether the reproduced voice signal from the recording medium is still inputted.

On the contrary, if it is checked at step S3 that no reproduced voice signal from the recording medium has been inputted, the microcomputer 9 outputs a control signal to the motor 8 at step S5 to temporarily stop it. Then, the microcomputer 9 checks at step S6 whether a voice signal recited by the user has been inputted. The input of recited voice signal is checked in the same manner as that of the reproduced voice signal as mentioned above. If it is checked at step S6 that the voice signal recited by the user has been inputted, the microcomputer 9 returns to step S5 to repeat steps S5 and S6.

In the case where it is checked at step S6 that no recited voice signal has been inputted, the microcomputer 9 outputs a control signal to the timer 7 at step S7 to reset it. Then at step S7, the microcomputer 9 starts a counting operation of the timer 7. The microcomputer 9 checks at step S8 whether the time counted by the timer 7 is greater than or equal to a predetermined reference time. The reference time is set to check whether the user has fully recited a given sentence. For example, the reference time may be set to one second. In this case, the input of no recited voice signal for one or more seconds indicates that the user has fully recited a given sentence. Preferably, the reference time may be flexibly set according to the user's language learning ability.

In the case where it is checked at step S8 that the time counted by the timer 7 is smaller than the predetermined reference time, the microcomputer 9 again checks at step S9 whether a voice signal recited by the user has been inputted. If it is checked at step S9 that no recited voice signal has been inputted, the microcomputer 9 returns to step S8 to repeat steps S8 and S9.

On the contrary, if it is checked at step S9 that the voice signal recited by the user has been inputted, the microcomputer 9 determines that a given sentence has not fully been reproduced. As a result, the microcomputer 9 returns to step S5 to repeat step S5 and the subsequent steps.

On the other hand, in the case where it is checked at step S8 that the time counted by the timer 7 is greater than or equal to the predetermined reference time, the microcomputer 9 determines that a given sentence has been fully reproduced. As a result, the microcomputer 9 drives the motor 8 at step S10 to perform the reproduction operation at step S11. Then, the microcomputer 9 checks at step S12 whether the speaking practice function has been turned off. If it is checked at step S12 that the speaking practice function has not been turned off, the microcomputer 9 returns to step S3 to repeat step S3 and the subsequent steps. On the contrary, if it is checked at step S12 that the speaking practice function has been turned off, the microcomputer 9 ends the entire process. As a result, after the reproduced voice signal from the recording medium is outputted, the reproduction operation is suspended for a period of time during which the user gives a language recitation regardless of the length of the reproduced voice signal. Therefore, the user can learn a language efficiently.

As is apparent from the above description, according to the present invention, after the reproduced voice signal from the recording medium is outputted, the reproduction operation is suspended regardless of the length of the reproduced voice signal for a time period that the user gives a language recitation. Therefore, the user has sufficient reciting time, resulting in an increase in language learning efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling the reciting time of a language learning device, said language learning device comprising a recording medium containing a recorded voice signal, a timer for outputting time information, a motor for transporting said recording medium in the desired direction, and a microcomputer for controlling the entire operation of said language learning device, said method comprising the steps of:

(a) reproducing the voice signal for an interval of time controlled by said microcomputer; and said microcomputer automatically stopping said motor to suspend the reproduction operation until an input of a voice signal recited by a user is completed and automatically driving said motor if the input of the recited voice signal is completed, to resume the reproduction operation;

wherein said step (b) includes the steps of said microcomputer:

(b-1) stopping said motor to if the recorded voice signal is not reproduction for a predetermined time period, thereby suspending the reproduction operation;

(b-2) checking whether the recited voice signal has been inputted and maintaining said motor at its stopped state if it is determined that the recited voice signal has been inputted; and (b-3) driving said motor if it is determined at said step (b-2) that no recited voice signal has been inputted, to resume the reproduction operation.

2. A method for controlling the reciting time of a language learning device, as set forth in claim 1, wherein said step (b-3) includes the steps of:

(b-3-1) setting a reference time;

(b-3-2) starting a counting operation at a time when the input of the voice signal recited by the user is discontinued;

(b-3-3) checking whether a counted time produced by the counting operation is greater than a reference time;

(b-3-4) driving said motor if it is determined at said step (b-3-3) that the counted time is greater than the reference time, thereby resuming the reproduction operation;

(b-3-5) checking whether the recited voice signal has been inputted, if it is determined at said step (b-3-3) that the counted time is not greater than the reference time; and (b-3-6) returning to said step (b-2) if it is determined at said step (b-3-5) that the recited voice signal has been inputted.

3. A method for controlling the reciting time of a language learning device, as set forth in claim 2, wherein the reference time is flexibly set according to the user's language learning ability.

* * * * *